US011927153B2

(12) United States Patent
Miyahara et al.

(10) Patent No.: US 11,927,153 B2
(45) Date of Patent: Mar. 12, 2024

(54) DIAGNOSTIC SYSTEM FOR EVAPORATED FUEL TREATMENT SYSTEM

(71) Applicant: TOYOTA JIDOSHA KABUSHIKI KAISHA, Toyota (JP)

(72) Inventors: Hideki Miyahara, Miyoshi (JP); Takumi Anzawa, Toyota (JP); Shogo Chikada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 17/929,354

(22) Filed: Sep. 2, 2022

(65) Prior Publication Data

US 2023/0122371 A1 Apr. 20, 2023

(30) Foreign Application Priority Data

Oct. 14, 2021 (JP) ................. 2021-168883

(51) Int. Cl.
*F02M 25/08* (2006.01)
*B01D 53/04* (2006.01)
*G07C 5/08* (2006.01)

(52) U.S. Cl.
CPC ..... *F02M 25/0809* (2013.01); *B01D 53/0415* (2013.01); *F02M 25/0872* (2013.01); *G07C 5/0808* (2013.01); *B01D 2253/102* (2013.01); *B01D 2257/702* (2013.01); *B01D 2259/4516* (2013.01); *B01D 2259/4566* (2013.01)

(58) Field of Classification Search
CPC ........... F02M 25/0809; F02M 25/0872; F02M 25/08; F02M 25/0836; F02M 25/089; B01D 53/0415; B01D 2253/102; B01D 2257/702; B01D 2259/4516; B01D 2259/4566; B01D 53/04; G07C 5/0808
See application file for complete search history.

(56) References Cited

U.S. PATENT DOCUMENTS

2003/0075156 A1* 4/2003 Morinaga .......... F02M 25/0809
73/114.39

FOREIGN PATENT DOCUMENTS

JP 2003-120437 A 4/2003
JP 2018-080597 A 5/2018

\* cited by examiner

*Primary Examiner* — Xiao En Mo
(74) *Attorney, Agent, or Firm* — Finnegan, Henderson, Farabow, Garrett & Dunner, LLP (57) ABSTRACT

A diagnostic device is configured to execute a first acquisition process of acquiring a remaining amount of evaporated fuel in a fuel tank when an ignition switch turns off, as an end remaining amount, a determination process of, after the first acquisition process, determining whether there is a blockage of a vapor passage by reducing a pressure in a vapor passage with a pressure reducing pump when the end remaining amount is smaller than a prescribed value while the ignition switch is off, a second acquisition process of, after the determination process, acquiring a remaining amount of liquid fuel in the fuel tank when the ignition switch turns on, as a start remaining amount, and an invalidation process of invalidating a determination result that a blockage is present in the vapor passage in the determination process when the start remaining amount is larger than or equal to a set value.

5 Claims, 3 Drawing Sheets

DIAGNOSTIC SYSTEM FOR EVAPORATED FUEL TREATMENT SYSTEM

CROSS-REFERENCE TO RELATED APPLICATION

This application claims priority to Japanese Patent Application No. 2021-168883 filed on Oct. 14, 2021, incorporated herein by reference in its entirety.

BACKGROUND

1. Technical Field

The disclosure relates to a diagnostic system for an evaporated fuel treatment system.

2. Description of Related Art

A diagnostic system for an evaporated fuel treatment system, described in Japanese Unexamined Patent Application Publication No. 2018-080597 (JP 2018-080597 A), includes a fuel tank, a canister, a vapor passage, a purge passage, a pressure reducing mechanism, and a diagnostic device. The fuel tank stores liquid fuel. The vapor passage connects the fuel tank with the canister. The canister adsorbs evaporated fuel generated in the fuel tank to collect the evaporated fuel. The purge passage connects the canister with an intake passage of an internal combustion engine. The pressure reducing mechanism is capable of reducing the pressure in the vapor passage.

In the vapor passage, a blockage due to, for example, clogging of foreign matter or the like can occur. The diagnostic device reduces the pressure in the vapor passage with the use of the pressure reducing mechanism during a stop of the internal combustion engine. The diagnostic device determines whether there is a blockage of the vapor passage based on a change in liquid level in the fuel tank at that time.

SUMMARY

In the technology of JP 2018-080597 A, a float valve is located in the fuel tank. The float valve shuts off a fuel tank-side opening in the vapor passage when there is a large amount of liquid fuel. Even when the pressure in the vapor passage is reduced in a state where the float valve is closing the opening of the vapor passage, the liquid level in the fuel tank does not change in response to the reduction of the pressure in the vapor passage. However, in a situation in which there is a large amount of liquid fuel, it may be not possible to properly determine whether there is a blockage of the vapor passage.

A diagnostic system for an evaporated fuel treatment system includes a fuel tank configured to store liquid fuel, a canister configured to adsorb evaporated fuel generated in the fuel tank to collect the evaporated fuel, a vapor passage connecting the fuel tank with the canister, a float valve disposed in the fuel tank and configured to move up and down in accordance with a change in level of liquid fuel to close and open an opening of the vapor passage adjacent to the fuel tank, a remaining amount sensor disposed in the fuel tank and configured to detect a remaining amount of liquid fuel, a pressure reducing mechanism configured to reduce a pressure in the vapor passage, and a diagnostic device configured to determine whether there is a blockage of the vapor passage. The diagnostic device is configured to execute a first acquisition process of acquiring a remaining amount of liquid fuel in the fuel tank when an ignition switch of a vehicle on which the fuel tank is mounted turns off, as an end remaining amount, a determination process of, after the first acquisition process, determining whether there is a blockage of the vapor passage by reducing a pressure in the vapor passage with the use of the pressure reducing mechanism when the end remaining amount is smaller than a predetermined prescribed value while the ignition switch of the vehicle is off, a second acquisition process of, after the determination process, acquiring a remaining amount of liquid fuel in the fuel tank when the ignition switch of the vehicle turns on, as a start remaining amount, and an invalidation process of invalidating a determination result that a blockage is present in the vapor passage in the determination process when the start remaining amount is larger than or equal to a predetermined set value.

In the above configuration, in order to determine whether there is a blockage of the vapor passage in a situation other than a situation in which the float valve is closing the opening of the vapor passage, the determination process is executed on condition that the end remaining amount is smaller than the prescribed value. Here, after the ignition switch turns off, liquid fuel can be added to the fuel tank in a period before the determination process. In this case, even when the opening of the vapor passage is not closed at the time when the ignition switch of the vehicle turns off, the float valve can be closing the opening of the vapor passage at the time when the determination process is executed. When the determination process is executed in this situation, it is likely to be not possible to properly determine whether there is a blockage of the vapor passage. In this way, even when the determination process is executed on condition that the end remaining amount is smaller than the prescribed value, the reliability of a determination result in the determination process decreases depending on the situation of addition of liquid fuel. Therefore, in the above configuration, when the start remaining amount is larger than or equal to the set value, the determination result that a blockage is present in the vapor passage is invalidated. This prevents that the situation of whether there is a blockage of the vapor passage is erroneously grasped.

In the diagnostic system, the diagnostic device may be configured to, when the diagnostic device determines in the determination process that no blockage is present in the vapor passage, not execute the invalidation process and validate a determination result that no blockage is present in the vapor passage.

When the float valve is closing the opening of the vapor passage, a manner in which the pressure in the vapor passage changes at the time when the pressure is reduced by the pressure reducing mechanism is the same as that when a blockage is present in the vapor passage. Therefore, the determination result that a blockage is present in the vapor passage may possibly not reflect a situation in which a blockage is present in the vapor passage and may possibly reflect a situation in which the float valve is closing the opening of the vapor passage. Therefore, the determination result that a blockage is present in the vapor passage needs to be invalidated.

On the other hand, when the float valve is not closing the opening of the vapor passage, a manner in which the pressure in the vapor passage changes at the time when the pressure is reduced by the pressure reducing mechanism varies according to whether there is a blockage in the vapor passage. When the determination result that no blockage is present in the vapor passage is obtained, the determination result is able to be estimated as a result capturing a change in pressure, which can occur with a reduction of the pressure in the vapor passage in a situation in which the float valve is not closing the opening of the vapor passage. In other words, when the determination result of the determination process is that no blockage is present in the vapor passage, it may be estimated that the float valve is not closing the opening of the vapor passage at the time when the determination process is executed. When the float valve is not closing the opening of the vapor passage at the time when the determination process is executed, the determination result of the determination process does not need to be invalidated. Therefore, in the above configuration, the determination result that no blockage is present in the vapor passage is validated. With such a configuration, a situation in which no blockage is present in the vapor passage is reliably grasped.

In the diagnostic system, the diagnostic device may be configured to, in the invalidation process, when a value obtained by subtracting the end remaining amount from the start remaining amount is larger than or equal to a predetermined determination value, assume that the start remaining amount is larger than or equal to the set value and invalidate a determination result that a blockage is present in the vapor passage.

When there is a large difference between the start remaining amount and the end remaining amount, it may be estimated that liquid fuel is added to the fuel tank while the ignition switch is off. When liquid fuel is added to the fuel tank, liquid fuel is mostly added up to substantially a full level in most cases. In this case, the float valve closes the opening of the vapor passage. Therefore, in the above configuration, when the difference between the start remaining amount and the end remaining amount is larger than or equal to the determination value, the start remaining amount is assumed as being larger than or equal to the set value, and the determination result that a blockage is present in the vapor passage is invalidated. Here, a detected value of the remaining amount sensor can include an error according to an individual difference of the remaining amount sensor. For this reason, in determining whether to invalidate the determination result of the determination process, when the magnitude of the detected value of the remaining amount sensor itself is referenced, the determination can be erroneously made due to an error according to the individual difference. In this regard, when the amount of change in the remaining amount of liquid fuel is checked as in the case of the above configuration, a situation in which the determination result of the determination process should be invalidated is able to be grasped regardless of an error of a detected value according to the individual difference of the remaining amount sensor.

In the diagnostic system, the diagnostic device may be configured to, in the determination process, determine whether there is a blockage of the vapor passage based on an amount of change per unit time in pressure in the vapor passage when the pressure reducing mechanism has reduced a pressure in the vapor passage.

When no blockage is present in the vapor passage and the float valve is not closing the opening of the vapor passage, the fuel tank is included in a part to be reduced in pressure by the pressure reducing mechanism. In this case, the volume of the part to be reduced in pressure increases. Therefore, when the pressure is reduced by the pressure reducing mechanism, the amount of decrease in pressure in the vapor passage reduces. On the other hand, when a blockage is present in the vapor passage, the fuel tank is not included in objects to be reduced in pressure by the pressure reducing mechanism. In this case, the volume of the part to be reduced in pressure reduces. Therefore, when the pressure is reduced by the pressure reducing mechanism, the amount of decrease in pressure in the vapor passage increases. Because of such a causal relationship, it is possible to appropriately determine whether there is a blockage of the vapor passage based on the amount of change in pressure in the vapor passage.

In the diagnostic system, the diagnostic device may be configured to execute the determination process after a lapse of a predetermined prescribed period from when the ignition switch of the vehicle turns off.

It is assumed that the float valve is not closing the opening of the vapor passage. Here, after the ignition switch turns off, a large amount of evaporated fuel is generated in a state where the temperature of liquid fuel in the fuel tank is still high. When the pressure is reduced by the pressure reducing mechanism in this state, a change in pressure in the vapor passage reduces because a large amount of evaporated fuel is present in the vapor passage. In this case, an appropriate determination result may not be obtained through the determination process. In terms of this point, as in the case of the above configuration, in a state where a certain period of time has elapsed after the ignition switch turns off, liquid fuel in the fuel tank is cooled, and generation of evaporated fuel is reduced. In this state, by executing the determination process while reducing the pressure in the vapor passage, it is possible to obtain an appropriate determination result.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a diagnostic system for an evaporated fuel treatment system will be described with reference to the accompanying drawings.

Schematic Configuration of Vehicle

Figure 1:
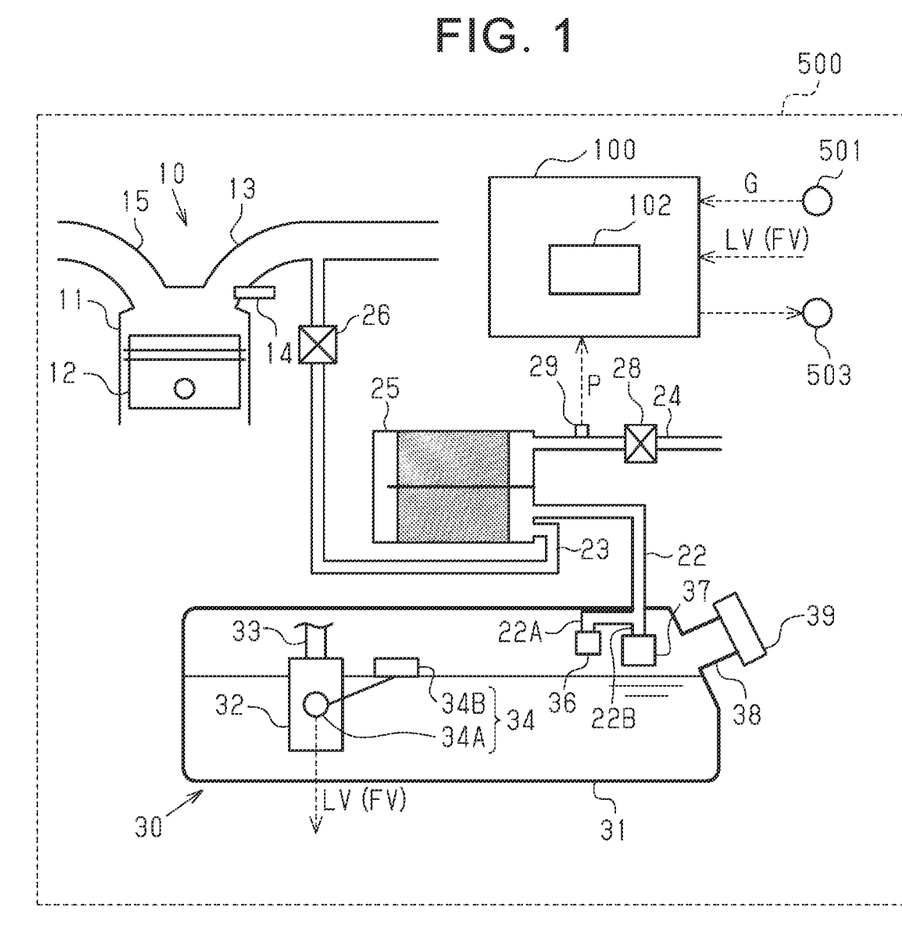
FIG. 1 is a schematic configuration diagram of a vehicle.

As shown in FIG. 1, a vehicle 500 includes an internal combustion engine 10. The internal combustion engine 10 is a driving source of the vehicle 500. The internal combustion engine 10 includes a plurality of cylinders 11, a plurality of pistons 12, an intake passage 13, a plurality of fuel injection valves 14, and an exhaust passage 15. FIG. 1 shows only one of the cylinders 11. This also applies to the pistons 12 and the fuel injection valves 14. The cylinders 11 are spaces in which fuel combusts. The piston 12 is provided for each cylinder 11. The piston 12 is located in the cylinder 11. The piston 12 is able to reciprocate in the cylinder 11. As the piston 12 reciprocates, a crankshaft that is the output shaft of the internal combustion engine 10 rotates. In FIG. 1, the crankshaft is not shown. The intake passage 13 is connected to the cylinders 11. The intake passage 13 is a passage for introducing intake air to the cylinders 11. The fuel injection valve 14 is provided for each cylinder 11. The fuel injection valve 14 is located in the middle of the intake passage 13. The fuel injection valve 14 injects fuel to the cylinder 11 via the intake passage 13. The exhaust passage 15 is connected to the cylinders 11. The exhaust passage 15 is a passage for emitting exhaust gas from the cylinders 11.

The vehicle 500 includes an additional mechanism 30. The additional mechanism 30 is a mechanism added to the internal combustion engine 10. The additional mechanism 30 includes a mechanism that supplies fuel to the internal combustion engine 10, and a mechanism that treats evaporated fuel. The additional mechanism 30, specifically, includes a fuel tank 31, a fuel pump 32, a fuel supply passage 33, a liquid level sensor 34, a filler pipe 38, and a cap 39.

The fuel tank 31 is able to store liquid fuel. The fuel pump 32 is located in the fuel tank 31. The fuel pump 32 pumps liquid fuel in the fuel tank 31 to the fuel supply passage 33. The fuel supply passage 33 connects the fuel pump 32 with the fuel injection valves 14.

The liquid level sensor 34 is located in the fuel tank 31. The liquid level sensor 34 includes a sensor body 34A and a float 34B. The float 34B is floating on the surface of liquid fuel. The sensor body 34A detects the level of the float 34B to detect the liquid level LV of liquid fuel.

The filler pipe 38 is connected to the fuel tank 31. The filler pipe 38 communicates with the inside of the fuel tank 31. The distal end of the filler pipe 38 on the side opposite to the side connected to the fuel tank 31 is a fill opening for refueling the fuel tank 31. The cap 39 is detachable from the fill opening.

The additional mechanism 30 includes a vapor passage 22, a canister 25, a purge passage 23, a purge valve 26, an atmosphere passage 24, a pressure sensor 29, a pressure reducing pump 28, a cut-off valve 36, and a roll over valve 37.

The vapor passage 22 connects the fuel tank 31 with the canister 25. The vapor passage 22 is, for example, an accordion hose. A distal end part of the vapor passage 22 adjacent to the fuel tank 31 is located in the fuel tank 31. The distal end part of the vapor passage 22 adjacent to the fuel tank 31 branches off into two. One of the branch passages in the vapor passage 22 is referred to as a first passage 22A, and the other is referred to as a second passage 22B. The distal end of the first passage 22A is open in the fuel tank 31. The distal end of the second passage 22B is open in the fuel tank 31.

The cut-off valve 36 is located in the fuel tank 31 at the opening of the first passage 22A. The cut-off valve 36 is a float valve. The cut-off valve 36 moves up and down in accordance with a change in the level of liquid fuel. In addition, the cut-off valve 36 opens and closes the first passage 22A. In other words, the cut-off valve 36 opens the first passage 22A when the liquid level LV of liquid fuel is low. On the other hand, the cut-off valve 36 closes the first passage 22A when the liquid level LV of liquid fuel is high.

The roll over valve 37 is located in the fuel tank 31 at the opening of the second passage 22B. The roll over valve 37 is also a float valve. The roll over valve 37, as well as the cut-off valve 36, moves up and down in accordance with a change in the level of liquid fuel. In addition, the roll over valve 37 opens and closes the second passage 22B.

The liquid level LV at which the cut-off valve 36 closes the first passage 22A is higher than the liquid level LV at which the roll over valve 37 closes the second passage 22B. The roll over valve 37 closes the second passage 22B when the fuel liquid level waves with, for example, a turn of the vehicle 500 and the liquid level rises. The cut-off valve 36 closes the first passage 22A when the liquid level rises to a level further higher than a level to which the liquid level rises with wave of the liquid level as in the case where a large amount of liquid fuel is added to the fuel tank 31. When the cut-off valve 36 closes the first passage 22A, the roll over valve 37 also closes the second passage 22B. In other words, in this state, both float valves respectively close the openings of the vapor passage 22 on the side adjacent to the fuel tank 31. Hereinafter, this state is described as that the float valve closes the opening of the vapor passage 22.

The canister 25 accommodates evaporated fuel adsorbent, such as activated carbon. The canister 25 adsorbs evaporated fuel generated in the fuel tank 31 to collect the evaporated fuel. The purge passage 23 connects the canister 25 with the intake passage 13 of the internal combustion engine 10. The purge valve 26 is located in the middle of the purge passage 23. The purge valve 26 opens and closes the purge passage 23. The atmosphere passage 24 extends from the canister 25 and is open to the atmosphere. The pressure reducing pump 28 is located in the middle of the atmosphere passage 24. The pressure reducing pump 28 emits gas in a pressure reducing object part including the vapor passage 22 to the outside via the atmosphere passage 24 when the purge valve 26 is in a closed state. Thus, the pressure reducing pump 28 reduces the pressure in the pressure reducing object part. The pressure reducing object part is specifically a part from the inside of the fuel tank 31 to the inside of the canister 25 and a part of the purge passage 23 on the side adjacent to the canister 25 when viewed from the purge valve 26. When the float valve closes the opening of the vapor passage 22 or, as will be described later, when a blockage is present in the vapor passage 22, the fuel tank 31 is not included in the pressure reducing object part. The pressure reducing pump 28 is a pressure reducing mechanism. The pressure sensor 29 is located in the middle of the atmosphere passage 24. More specifically, the pressure sensor 29 is located in the atmosphere passage 24 on the side adjacent to the canister 25 when viewed from the pressure reducing pump 28. The pressure sensor 29 detects the pressure P in the pressure reducing object part.

The vehicle 500 includes an ignition switch 501. The ignition switch 501 is a switch for starting and stopping the internal combustion engine 10. The ignition switch 501 turns on or off in response to user's operation.

The vehicle 500 includes an alarm lamp 503. The alarm lamp 503 is provided in a meter panel. The alarm lamp 503 is able to turns on. Although not shown in the drawing, the vehicle 500 includes a reset switch for causing the alarm lamp 503 to turn off.

Schematic Configuration of Controller

The vehicle 500 includes a controller 100. The controller 100 can be made up of one or more processors that execute various processes in accordance with a computer program (software). The controller 100 may be made up of one or more dedicated hardware circuits, such as application-specific integrated circuits (ASICs), that execute at least some of the various processes, or circuitry including a combination of them. Each processor includes a CPU, and a memory, such as a RAM and a ROM. The memory stores a program code or an instruction configured to cause the CPU to execute a process. The memory, that is, a computer-readable medium, includes any usable medium accessible by a general-purpose or special-purpose computer. The controller 100 includes a storage device that is an electrically rewritable nonvolatile memory. The controller 100 includes a timer that measures time.

The controller 100 receives a signal G from the ignition switch 501. The controller 100 receives a signal related to the pressure P in the pressure reducing object part, detected by the pressure sensor 29. The controller 100 receives a signal related to the liquid level LV detected by the liquid level sensor 34. The controller 100 converts the liquid level LV to the remaining amount FV of liquid fuel. In other words, the liquid level sensor 34 substantially functions as a remaining amount sensor that detects the remaining amount FV of liquid fuel. The remaining amount FV of liquid fuel is the percentage of a volume occupied by liquid fuel in the fuel tank 31. Here, the highest level of the liquid level LV that can be detected by the liquid level sensor 34 is referred to as maximum level. The maximum level is near the top wall of the fuel tank 31. The controller 100 divides the liquid level LV detected by the liquid level sensor 34 by the maximum level in converting the liquid level LV to the remaining amount FV of liquid fuel. The liquid level LV is quantified.

The controller 100 has a plurality of functional units for controlling and diagnosing various portions of the vehicle 500. One of such the functional units is an internal combustion engine diagnostic unit 102. The internal combustion engine diagnostic unit 102 is a functional unit for diagnosing the internal combustion engine 10 and the additional mechanism 30. The internal combustion engine diagnostic unit 102 functions as a diagnostic device. The internal combustion engine diagnostic unit 102 makes up the diagnostic system of the evaporated fuel system together with the fuel tank 31, the canister 25, the vapor passage 22, the cut-off valve 36, the roll over valve 37, the liquid level sensor 34, and the pressure reducing pump 28.

The internal combustion engine diagnostic unit 102 switches between an operating mode in which various processes are executed and a stop mode in which a processing operation is stopped. The internal combustion engine diagnostic unit 102 is basically set to the operating mode while the ignition switch 501 is on, and set to the stop mode while the ignition switch 501 is off. The internal combustion engine diagnostic unit 102 can be set to the operating mode upon receiving electric power supplied from a battery (not shown) even while the ignition switch 501 is off.

The internal combustion engine diagnostic unit 102 is in charge of controlling the pressure reducing pump 28 and the pressure sensor 29. Therefore, when the internal combustion engine diagnostic unit 102 is set to the operating mode while the ignition switch 501 is off, the internal combustion engine diagnostic unit 102 is able to energize the pressure reducing pump 28 and the pressure sensor 29 to activate the pressure reducing pump 28 and the pressure sensor 29. At this time, the internal combustion engine diagnostic unit 102 is able to receive the pressure P in the pressure reducing object part, detected by the pressure sensor 29. On the other hand, the internal combustion engine diagnostic unit 102 is not in charge of controlling the liquid level sensor 34. Therefore, even when the internal combustion engine diagnostic unit 102 is set to the operating mode while the ignition switch 501 is off, the internal combustion engine diagnostic unit 102 is not able to activate the liquid level sensor 34. In other words, the internal combustion engine diagnostic unit 102 is not able to grasp information on the remaining amount FV of liquid fuel in real time while the ignition switch 501 is off.

The internal combustion engine diagnostic unit 102 diagnoses whether there is leakage from, for example, a route running from the inside of the fuel tank 31 to the purge passage 23 as part of the process of diagnosing the internal combustion engine 10 and the additional mechanism 30. Here, a blockage can occur in the vapor passage 22. Clogging of foreign matter can be an example of a factor of a blockage of the vapor passage 22. The vapor passage 22 can be crushed or bent due to some impact as another example of a factor of a blockage. The internal combustion engine diagnostic unit 102 is able to execute a blockage diagnosis process for diagnosing whether there is a blockage of the vapor passage 22. The blockage diagnosis process is composed of three processes, that is, a first process, a second process, and a third process. Hereinafter, these three processes will be described in order.

First Process

The first process is a process that the internal combustion engine diagnostic unit 102 executes when the ignition switch 501 turns off. In other words, when the ignition switch 501 turns off, the internal combustion engine diagnostic unit 102 acquires the latest value of the remaining amount FV of liquid fuel as an end remaining amount FF and stores the end remaining amount FF as the first process. In this way, the end remaining amount FF is the remaining amount FV of liquid fuel at the time when the ignition switch 501 turns off. When the internal combustion engine diagnostic unit 102 ends the first process, the internal combustion engine diagnostic unit 102 switches into the stop mode. As will be described later, the internal combustion engine diagnostic unit 102 clears the end remaining amount FF at the time of ending the first process. The first process is a first acquisition process.

Second Process

The second process is a process that the internal combustion engine diagnostic unit 102 temporarily starts up to execute while the ignition switch 501 is off. In other words, the second process is a process that is executed after the first process is executed. The second process is a process for determining whether there is a blockage of the vapor passage 22. Specifically, the internal combustion engine diagnostic unit 102 reduces the pressure in the pressure reducing object part by using the pressure reducing pump 28 in the second process. The internal combustion engine diagnostic unit 102 determines whether there is a blockage of the vapor passage 22 based on a manner in which the pressure P in the pressure reducing object part changes at that time. In this way, the internal combustion engine diagnostic unit 102 determines whether there is a blockage of the vapor passage 22 by reducing the pressure in the pressure reducing object part with the use of the pressure reducing pump 28. The second process is a determination process.

Figure 2:
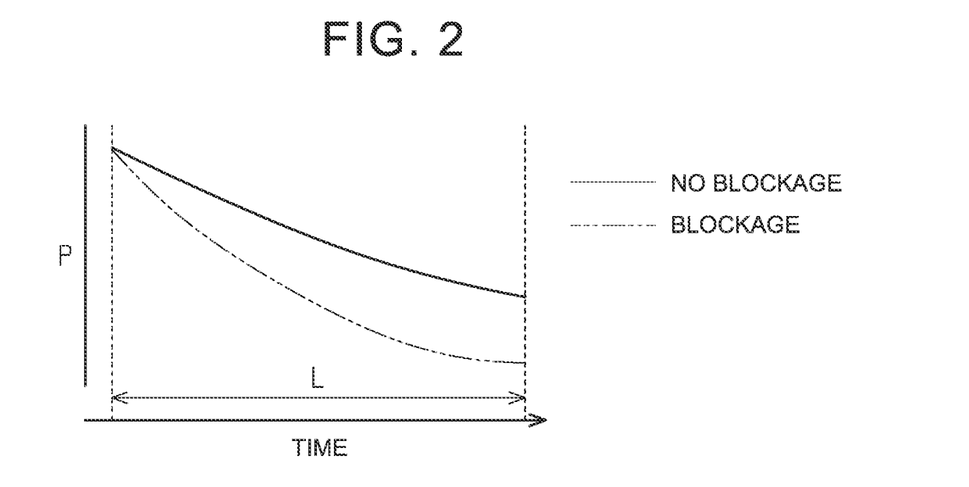
FIG. 2 is a timing chart showing an example of a temporal change in pressure in a pressure reducing object part.

A determining technique used for the second process will be described. Here, it is assumed that the purge valve 26 is in a closed state. It is also assumed that the float valve is not closing the opening of the vapor passage 22. As described above, the range of the pressure reducing object part varies depending on whether there is a blockage of the vapor passage 22. In other words, when no blockage is present in the vapor passage 22, the fuel tank 31 is included in the pressure reducing object part. On the other hand, when a blockage is present in the vapor passage 22, the fuel tank 31 is not included in the pressure reducing object part. For this reason, when a blockage is present in the vapor passage 22, the volume of the pressure reducing object part reduces by the amount of the fuel tank 31, more specifically, by the amount of a part on the upper side of the liquid surface in the fuel tank 31, as compared to when no blockage is present. Accordingly, as shown in FIG. 2, when a blockage is present in the vapor passage 22, the amount of decrease in the pressure P in the pressure reducing object part at the time when the pressure is reduced by driving the pressure reducing pump 28 for a set period L increases as compared to when no blockage is present. Therefore, the internal combustion engine diagnostic unit 102 determines that a blockage is present in the vapor passage 22 when the amount of decrease in the pressure P in the pressure reducing object part at the time when the pressure reducing pump 28 is driven for the set period L is larger than a predetermined reference value KA in the second process. The reference value KA will be described later together with a specific procedure of the second process. In this way, the internal combustion engine diagnostic unit 102 determines whether there is a blockage of the vapor passage 22 based on the amount of change in the pressure P in the pressure reducing object part at the time when the pressure reducing pump 28 is driven.

Assuming a situation in which no blockage is present in the vapor passage 22. As in the case of the above, it is assumed that the purge valve 26 is in a closed state. As described above, when the remaining amount FV of liquid fuel in the fuel tank 31 is large, the float valve closes the opening of the vapor passage 22. In this case, the fuel tank 31 is not included in the range of the pressure reducing object part. Therefore, when the pressure reducing pump 28 is driven to reduce the pressure in this situation, the amount of decrease in the pressure P in the pressure reducing object part increases as in the case where a blockage is present in the vapor passage 22. In other words, between the situation in which the float valve is closing the opening of the vapor passage 22 and the situation in which a blockage is present in the vapor passage 22, a manner in which the pressure P in the pressure reducing object part changes at the time when the pressure is reduced is substantially the same. Therefore, when it is determined whether there is a blockage of the vapor passage 22 in a situation in which the float valve is closing the opening of the vapor passage 22, the situation in which no blockage is present in the vapor passage 22 and the float valve is closing the opening of the vapor passage 22 can be erroneously determined that a blockage is present in the vapor passage 22. Therefore, the internal combustion engine diagnostic unit 102 performs a determination concerned with the vapor passage 22 while avoiding a situation in which it is estimated that the float valve is closing the opening of the vapor passage 22. As described above, the internal combustion engine diagnostic unit 102 is not able to grasp real-time information on the remaining amount FV of liquid fuel while the ignition switch 501 is off. Therefore, the internal combustion engine diagnostic unit 102 references the end remaining amount FF as latest information on the remaining amount FV of liquid fuel that can be grasped at the time of executing the second process, and it is determined whether to perform determination concerned with the vapor passage 22 by using the end remaining amount FF as a reference. Specifically, the internal combustion engine diagnostic unit 102 performs determination on whether there is a blockage of the vapor passage 22 when the end remaining amount FF stored in the first process is smaller than a prescribed value FM. The controller 100 stores the prescribed value FM in advance. The prescribed value FM is determined by an experiment in advance as a remaining amount FV slightly smaller than the remaining amount FV of liquid fuel at which the cut-off valve 36 switches into a state where the first passage 22A is closed. The prescribed value FM is, for example, 85%.

Here, assuming a situation in which there is no blockage in the vapor passage 22 and the float valve is not closing the opening of the vapor passage 22. In this situation, when the temperature of liquid fuel in the fuel tank 31 is high, the vapor passage 22 is filled with evaporated fuel. Even when the pressure reducing pump 28 is driven to reduce the pressure in such a situation, the amount of change of the pressure P in the pressure reducing object part reduces because there is a large amount of evaporated fuel. In this case, there is a possibility that an accurate determination result is not able to be obtained through the second process. Therefore, the internal combustion engine diagnostic unit 102 executes the second process after a lapse of a prescribed period H1 from when the ignition switch 501 turns off. The prescribed period H1 is determined by, for example, an experiment in advance as a sufficient length of time for the temperature of liquid fuel decreases to a necessary temperature after the ignition switch 501 turns off. The prescribed period H1 is, for example, five hours. The necessary temperature is the temperature of liquid fuel at which generation of evaporated fuel has converged and the result with high reliability is obtained in the second process. The necessary temperature is, for example, room temperature.

Third Process

The third process is a process that the internal combustion engine diagnostic unit 102 executes when the ignition switch 501 turns on. In other words, the third process is a process that is executed after the second process is executed. The third process is a process for confirming that the determination result of the second process is valid or invalid. As described above, in the second process, in order to determine whether there is a blockage of the vapor passage 22 in a situation other than a situation in which the float valve is closing the opening of the vapor passage 22, the determination process of the vapor passage 22 is executed on condition that the end remaining amount FF is smaller than the prescribed value FM. Here, after the ignition switch 501 turns off, liquid fuel can be added to the fuel tank 31 in a period before the second process. In this case, even when the float valve is not closing the opening of the vapor passage 22 at the time when the ignition switch 501 is turned off, the float valve can be closing the opening of the vapor passage 22 at the time when the second process is executed. When it is determined whether there is a blockage of the vapor passage 22 in this situation, it is likely to be not possible to obtain a proper determination result. Therefore, the internal combustion engine diagnostic unit 102 determines whether the determination result of the second process is valid or invalid based on the remaining amount FV of liquid fuel at the time when the ignition switch 501 is turned on.

Specifically, the internal combustion engine diagnostic unit 102 executes a second acquisition process as part of the third process. The internal combustion engine diagnostic unit 102, in the second acquisition process, acquires the remaining amount FV of liquid fuel in the fuel tank 31 as a start remaining amount FS when the ignition switch 501 turns on. The internal combustion engine diagnostic unit 102 executes an invalidation process as part of the third process. The internal combustion engine diagnostic unit 102, in the invalidation process, invalidates the determination result that a blockage is present in the vapor passage 22 in the second process when the start remaining amount FS is larger than or equal to the set value FW. The reason is as follows. Here, the set value FW is determined in advance as a value larger than the prescribed value FM. Therefore, when the start remaining amount FS is larger than or equal to the set value FW, the start remaining amount FS is larger than the prescribed value FM. When the start remaining amount FS is larger than or equal to the prescribed value FM, there is a possibility that the float valve is closing the opening of the vapor passage 22 at the time when the second process is executed. Therefore, when the start remaining amount FS is larger than or equal to the prescribed value FM, there is a possibility that the determination result that a blockage is present in the vapor passage 22 reflects a situation in which no blockage is present in the vapor passage 22 and the float valve is closing the opening of the vapor passage 22. Therefore, when the start remaining amount FS is larger than or equal to the prescribed value FM, it is conceivable to invalidate the determination result that a blockage is present in the vapor passage 22. However, in invalidating the determination result, it is desirably regarded that there is reliably a blockage in the vapor passage 22. Therefore, in the present embodiment, the set value FW larger than the prescribed value FM is determined as a reference in invalidating the determination result. In other words, the set value FW is determined by an experiment in advance as a value by which it is regarded that the float valve is reliably closing the opening of the vapor passage 22. The set value FW may be, for example, set to the remaining amount FV of liquid fuel by which the cut-off valve 36 switches into a state where the first passage 22A is closed.

On the other hand, when the start remaining amount FS is larger than or equal to the set value FW in the third process but the internal combustion engine diagnostic unit 102 determines that no blockage is present in the vapor passage 22 in the second process, the internal combustion engine diagnostic unit 102 does not execute the invalidation process and validates the determination result that no blockage is present in the vapor passage 22. This is because of the following reason. In relation to the determination technique in the second process, the determination result that no blockage is present in the vapor passage 22 corresponds to the fact that the amount of decrease in the pressure P in the pressure reducing object part at the time when the pressure is reduced by the pressure reducing pump 28 is small. The fact that the amount of decrease in the pressure P in the pressure reducing object part is small means that the fuel tank 31 is included in the range of the pressure reducing object part. In other words, the determination result that no blockage is present in the vapor passage 22 is obtained only in a situation in which the float valve is not closing the opening of the vapor passage 22 and the fuel tank 31 is included in the pressure reducing object part. Therefore, when it is determined that no blockage is present in the vapor passage 22, it is likely that the float valve is not closing the opening of the vapor passage 22. In consideration of the above reason, the internal combustion engine diagnostic unit 102 validates the determination result that no blockage is present in the vapor passage 22.

The internal combustion engine diagnostic unit 102, in the third process, validates the determination result of the second process when the start remaining amount FS is smaller than the set value FW. When the start remaining amount FS is smaller than the set value FW, it may be estimated that the float valve is not closing the opening of the vapor passage 22 at the time when the second process is executed.

Temporary Confirmation Flag and Final Confirmation Flag

The internal combustion engine diagnostic unit 102 sets flags in accordance with a diagnosed result in the blockage diagnosis process. The flags will be described. The internal combustion engine diagnostic unit 102 sets two flags. One of the flags is a temporary confirmation flag F1. The other one of the flags is a final confirmation flag F2. The internal combustion engine diagnostic unit 102 continues to hold a current-state value for each of the two flags until the internal combustion engine diagnostic unit 102 updates those values regardless of whether the ignition switch 501 is on or off.

The temporary confirmation flag F1 is a flag that the internal combustion engine diagnostic unit 102 sets in the second process and indicates a temporarily diagnosed result. The internal combustion engine diagnostic unit 102 sets "1", "2", or "3" as the temporary confirmation flag F1 in the second process. The flag set to "1" indicates that determination on whether there is a blockage of the vapor passage 22 has not been executed. The flag set to "2" indicates a determination result that no blockage is present in the vapor passage 22. The flag set to "3" indicates a determination result that a blockage is present in the vapor passage 22. The internal combustion engine diagnostic unit 102, in the first process, resets the temporary confirmation flag F1 to "1" in parallel with storing the end remaining amount FF. The internal combustion engine diagnostic unit 102 updates the value of the temporary confirmation flag F1 in accordance with the process details in the second process. When, for example, the period in which the ignition switch 501 is off is short and the second process is not able to be executed, the internal combustion engine diagnostic unit 102 does not update the value of the temporary confirmation flag F1 in the second process.

The final confirmation flag F2 is a flag that the internal combustion engine diagnostic unit 102 sets in the third process and indicates a finally confirmed diagnosed result on whether there is a blockage of the vapor passage 22. The internal combustion engine diagnostic unit 102 sets "1", "2", or "3" as the final confirmation flag F2 in the third process. The flag set to "1" indicates that it is not clear whether a blockage is present in the vapor passage 22. The flag set to "2" indicates that no blockage is present in the vapor passage 22. The flag set to "3" indicates that a blockage is present in the vapor passage 22. The internal combustion engine diagnostic unit 102 resets the final confirmation flag F2 to "1" in the first process as in the case of the temporary confirmation flag F1. The internal combustion engine diagnostic unit 102 updates the value of the final confirmation flag F2 in accordance with the process details in the third process.

When the internal combustion engine diagnostic unit 102 and the other functional units in the controller 100 need to grasp the status of the vapor passage 22 in, for example, another process, the internal combustion engine diagnostic unit 102 and the other functional units in the controller 100 reference information of the final confirmation flag F2 without referencing information of the temporary confirmation flag F1.

Specific Procedure of Second Process

As described above, when the ignition switch 501 turns off, the internal combustion engine diagnostic unit 102 executes the first process at that timing. In other words, when the ignition switch 501 turns off, the internal combustion engine diagnostic unit 102 stores the end remaining amount FF and resets both the temporary confirmation flag F1 and the final confirmation flag F2 to "1". After that, the internal combustion engine diagnostic unit 102 switches into the stop mode. After that, the internal combustion engine diagnostic unit 102 automatically starts up after a lapse of the prescribed period H1. In other words, the internal combustion engine diagnostic unit 102 switches into the operating mode. Then, the internal combustion engine diagnostic unit 102 starts the second process. At the time when the second process is started, the pressure reducing pump 28 is stopped. The purge valve 26 is in a closed state.

Figure 3:
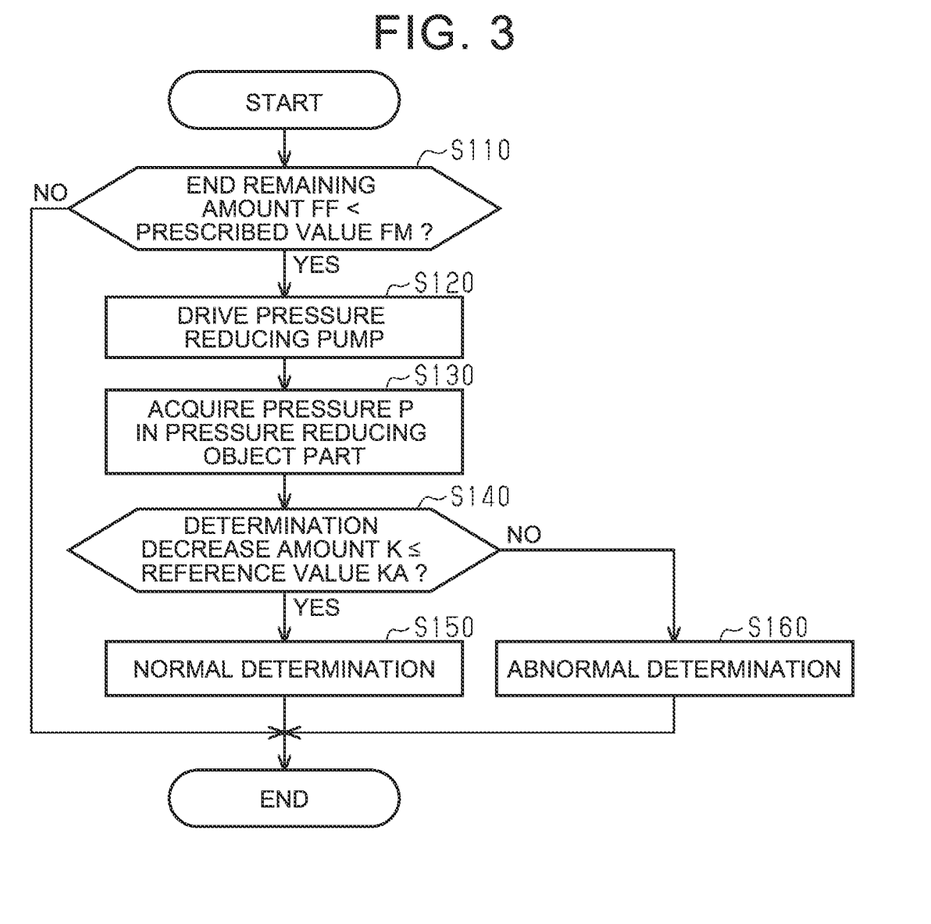
FIG. 3 is a flowchart showing the procedure of a second process.

As shown in FIG. 3, when the internal combustion engine diagnostic unit 102 starts the second process, the internal combustion engine diagnostic unit 102 initially executes the process of step S110. In step S110, the internal combustion engine diagnostic unit 102 determines whether the end remaining amount FF stored in itself is smaller than the prescribed value FM. When the internal combustion engine diagnostic unit 102 determines that the end remaining amount FF is larger than or equal to the prescribed value FM (NO in step S110), the internal combustion engine diagnostic unit 102 maintains the temporary confirmation flag F1 at "1" and ends the series of processes of the second process. At this time, the internal combustion engine diagnostic unit 102 clears the end remaining amount FF. When the internal combustion engine diagnostic unit 102 ends the second process, the internal combustion engine diagnostic unit 102 switches into the stop mode. In terms of this point, the same applies to the case where the second process is ended via the processes of other steps.

On the other hand, when the end remaining amount FF is smaller than the prescribed value FM (YES in step S110), the internal combustion engine diagnostic unit 102 proceeds with the process to step S120. In step S120, the internal combustion engine diagnostic unit 102 drives the pressure reducing pump 28. Accordingly, the pressure P in the pressure reducing object part decreases. In step S120, the internal combustion engine diagnostic unit 102 activates the pressure sensor 29. After that, the internal combustion engine diagnostic unit 102 proceeds with the process to step S130.

In step S130, the internal combustion engine diagnostic unit 102 repeatedly acquires the pressure P in the pressure reducing object part until the determination period H2 elapses after the process proceeds to step S130. The internal combustion engine diagnostic unit 102 stores the determination period H2 in advance. The determination period H2 is determined as the length of time that a highly-reliable determination result is obtained in determining whether there is a blockage of the vapor passage 22 based on the amount of change in the pressure P in the pressure reducing object part. The determination period H2 is, for example, 15 seconds. When the determination period H2 elapses after the process proceeds to step S130, the internal combustion engine diagnostic unit 102 stops the pressure reducing pump 28 and the pressure sensor 29 and then proceeds with the process to step S140.

In step S140, the internal combustion engine diagnostic unit 102 determines whether the amount of decrease in the pressure P in the pressure reducing object part in the determination period H2 (hereinafter, referred to as determination decrease amount) K is smaller than or equal to the reference value KA. The controller 100 calculates the absolute value obtained by subtracting the oldest pressure P from the latest pressure P of a series of data acquired in step S130 as a determination decrease amount K in performing the determination. The internal combustion engine diagnostic unit 102 compares the determination decrease amount K with the reference value KA stored in advance. The reference value KA is determined by an experiment in advance as the following value. Now it is assumed that the prescribed period H1 has elapsed after the ignition switch 501 turns off. Then, it is assumed that the purge valve 26 is in a closed state and no blockage is present in the vapor passage 22 and the float valve is not closing the opening of the vapor passage 22. It is assumed that the pressure reducing pump 28 is driven in such a situation. At this time, in the determination period H2, a maximum value that the absolute value of the amount of change in the pressure P in the pressure reducing object part can take is referred to as normal maximum value. The reference value KA is the normal maximum value. When the determination decrease amount K is smaller than or equal to the reference value KA (YES in step S140), the internal combustion engine diagnostic unit 102 proceeds with the process to step S150.

In step S150, the internal combustion engine diagnostic unit 102 determines that no blockage is present in the vapor passage 22 and the vapor passage 22 is normal. In this case, the internal combustion engine diagnostic unit 102 sets the temporary confirmation flag F1 to "2". After that, the internal combustion engine diagnostic unit 102 clears the series of data acquired in step S130 and the end remaining amount FF and then ends the series of processes of the second process.

On the other hand, in step S140, when the determination decrease amount K is greater than the reference value KA (NO in step S140), the internal combustion engine diagnostic unit 102 proceeds with the process to step S160. In step S160, the internal combustion engine diagnostic unit 102 determines that a blockage is present in the vapor passage 22 and the vapor passage 22 is abnormal. In this case, the internal combustion engine diagnostic unit 102 sets the temporary confirmation flag F1 to "3". After that, the internal combustion engine diagnostic unit 102 clears the series of data acquired in step S130 and the end remaining amount FF and then ends the series of processes of the second process.

Specific Procedure of Third Process

Figure 4:
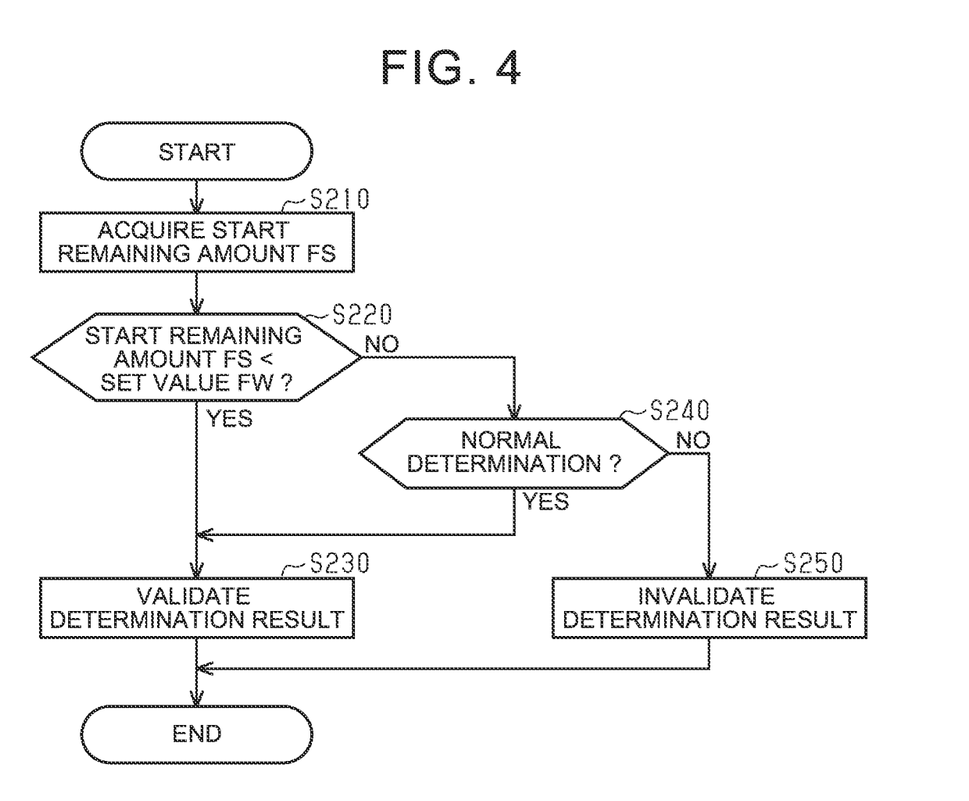
FIG. 4 is a flowchart showing the procedure of a third process.

When the ignition switch 501 turns on, the internal combustion engine diagnostic unit 102 switches into the operating mode and starts the third process. As shown in FIG. 4, when the internal combustion engine diagnostic unit 102 starts the third process, the internal combustion engine diagnostic unit 102 executes the process of step S210. In step S210, the controller 100 acquires the latest value of the remaining amount FV of liquid fuel as a start remaining amount FS. After that, the controller 100 proceeds with the process to step S220. The process of step S210 is a second acquisition process.

In step S220, the internal combustion engine diagnostic unit 102 determines whether the start remaining amount FS acquired in step S210 is smaller than the set value FW. When the start remaining amount FS is smaller than the set value FW (YES in step S220), the internal combustion engine diagnostic unit 102 proceeds with the process to step S230.

In step S230, the internal combustion engine diagnostic unit 102 validates the determination result on whether there is a blockage of the vapor passage 22, obtained in the second process. As a specific process of step S230, the internal combustion engine diagnostic unit 102 grasps the determination result of the second process by referencing the temporary confirmation flag F1. When the temporary confirmation flag F1 is "2", that is, when the determination result of the second process indicates that no blockage is present in the vapor passage 22, the internal combustion engine diagnostic unit 102 sets the final confirmation flag F2 to "2". When the temporary confirmation flag F1 is "3", that is, when the determination result of the second process indicates that a blockage is present in the vapor passage 22, the internal combustion engine diagnostic unit 102 sets the final confirmation flag F2 to "3". In addition to this, when the temporary confirmation flag F1 is "3", the internal combustion engine diagnostic unit 102 turns on the alarm lamp 503. The temporary confirmation flag F1 can be "1" at the time when the process proceeds to step S230. The case where the temporary confirmation flag F1 is "1" is a case where a period during which the ignition switch 501 is off is short and, therefore, the second process is not executed or a case where the second process has been executed but it is not determined whether there is a blockage of the vapor passage 22. In this case, the internal combustion engine diagnostic unit 102 sets the final confirmation flag F2 to "1". After the internal combustion engine diagnostic unit 102 executes the process of step S230 as described above, the internal combustion engine diagnostic unit 102 clears the start remaining amount FS and then ends the series of processes of the third process.

On the other hand, in step S220, when the start remaining amount FS is larger than or equal to the set value FW (NO in step S220), the internal combustion engine diagnostic unit 102 proceeds with the process to step S240. In step S240, the internal combustion engine diagnostic unit 102 determines whether the determination result of the second process is normal. The internal combustion engine diagnostic unit 102 grasps the determination result of the second process by referencing the temporary confirmation flag F1. When the temporary confirmation flag F1 is "2", that is, when the determination result of the second process is normal and indicates that no blockage is present in the vapor passage 22 (YES in step S240), the internal combustion engine diagnostic unit 102 proceeds with the process to step S230 already described. In this case, the internal combustion engine diagnostic unit 102 sets the final confirmation flag F2 to "2" in step S230.

On the other hand, in step S240, when the temporary confirmation flag F1 is "3", that is, when the determination result of the second process indicates that a blockage is present in the vapor passage 22 (NO in step S240), the internal combustion engine diagnostic unit 102 proceeds with the process to step S250.

In step S250, the internal combustion engine diagnostic unit 102 invalidates the determination result of the second process. The process of step S250 is the invalidation process. As a specific process of step S250, the internal combustion engine diagnostic unit 102 sets the final confirmation flag F2 to "1". In other words, the internal combustion engine diagnostic unit 102 rejects the determination result that a blockage is present in the vapor passage 22, obtained in the second process, and determines that it is not clear whether a blockage is present in the vapor passage 22. After that, the internal combustion engine diagnostic unit 102 clears the start remaining amount FS and then ends the series of processes of the third process.

When the internal combustion engine diagnostic unit 102 sets the final confirmation flag F2 to "3", that is, the internal combustion engine diagnostic unit 102 confirms that a blockage is present in the vapor passage 22 and turns on the alarm lamp 503, the internal combustion engine diagnostic unit 102 does not execute the blockage diagnosis process until the reset switch is operated. When the alarm lamp 503 turns on, for example, a user that finds the turning on of the alarm lamp 503 drives the vehicle 500 to a dealer, a maintenance shop, or the like to check the vehicle 500. When the reset switch is operated, the internal combustion engine diagnostic unit 102 resumes the blockage diagnosis process.

Operation of Embodiment

Figure 5:
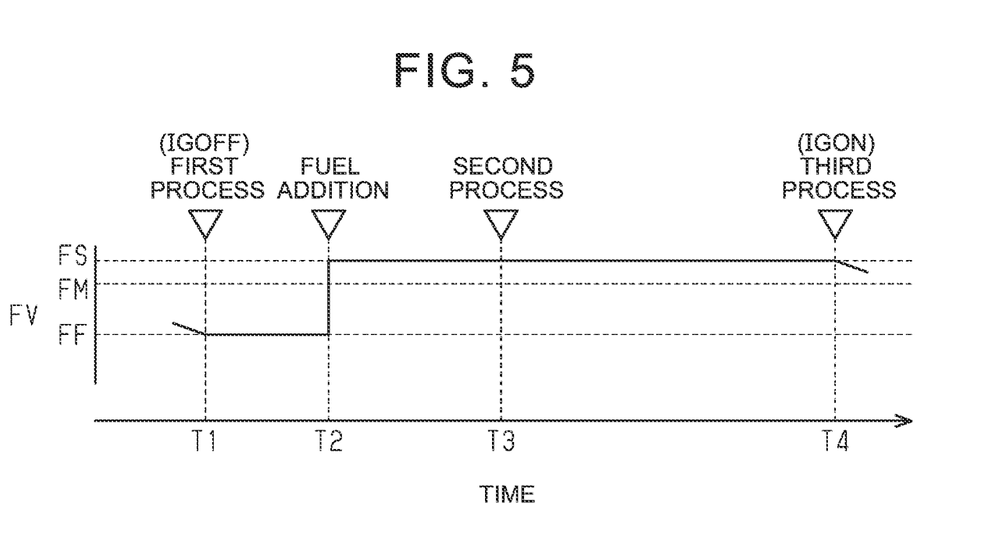
FIG. 5 is a timing chart showing an example of a temporal change in the remaining amount of liquid fuel.

As shown in FIG. 5, it is assumed that, at time T1, in a state where no blockage is present in the vapor passage 22, the ignition switch 501 turns off. Then, the internal combustion engine diagnostic unit 102, as the first process, stores the remaining amount FV of liquid fuel at this time as an end remaining amount FF. It is assumed that the end remaining amount FF is smaller than the prescribed value FM.

It is assumed that, at time T2 after time T1, liquid fuel is added. Then, it is assumed that, as a result of addition of liquid fuel, the remaining amount FV of liquid fuel becomes larger than or equal to the set value FW. In other words, the remaining amount FV of liquid fuel at this time is larger than the prescribed value FM.

After that, at time T3 that comes after a lapse of the prescribed period H1 from time T1, the internal combustion engine diagnostic unit 102 switches into the operating mode. Then, the internal combustion engine diagnostic unit 102 executes the second process. As described above, since the end remaining amount FF is smaller than the prescribed value FM (YES in step S110), the internal combustion engine diagnostic unit 102 determines whether there is a blockage of the vapor passage 22. As described above, as a result of addition of liquid fuel at time T2, the remaining amount FV of liquid fuel is larger than or equal to the set value FW. Therefore, the float valve is closing the opening of the vapor passage 22. In this case, the fuel tank 31 is not included in the range of the pressure reducing object part. Therefore, the amount of decrease in the pressure P in the pressure reducing object part during the determination period H2 is larger than the reference value KA (NO in step S140). As a result, the internal combustion engine diagnostic unit 102 determines that there is a blockage in the vapor passage 22 (step S160). Actually, at this time, no blockage is present in the vapor passage 22. In other words, the internal combustion engine diagnostic unit 102 erroneously determines a situation in which no blockage is present in the vapor passage 22 and the float valve is closing the opening of the vapor passage 22 as a situation in which a blockage is present in the vapor passage 22. After that, the internal combustion engine diagnostic unit 102 ends the second process and switches into the stop mode.

It is assumed that, at time T4 after time T3, the ignition switch 501 turns on. Then, the internal combustion engine diagnostic unit 102 switches into the operating mode and executes the third process. In other words, the internal combustion engine diagnostic unit 102 acquires the latest value of the remaining amount FV of liquid fuel as a start remaining amount FS (step S210). As a result of addition of fuel at time T2, the start remaining amount FS is larger than or equal to the set value FW (NO in step S220). As described above, the determination result in the second process indicates that a blockage is present in the vapor passage 22 (NO in step S240). From this, the internal combustion engine diagnostic unit 102, in the third process, executes the invalidation process to invalidate the determination result in the second process (step S250).

Advantageous Effects of Embodiment (1) In relation to a technique for determining whether there is a blockage of the vapor passage 22, when determination concerned with the vapor passage 22 is performed in a situation in which the float valve is closing the opening of the vapor passage 22, the situation in which the float valve is closing the opening of the vapor passage 22 can be erroneously determined that a blockage is present in the vapor passage 22. To avoid such an erroneous determination, the internal combustion engine diagnostic unit 102, in the second process, determines whether to perform determination concerned with the vapor passage 22 based on the remaining amount FV of liquid fuel. Here, since the internal combustion engine diagnostic unit 102 is not in charge of controlling the liquid level sensor 34, the internal combustion engine diagnostic unit 102 is not able to obtain real-time information of the remaining amount FV of liquid fuel while the ignition switch 501 is off. The internal combustion engine diagnostic unit 102, in the second process, determines whether to perform determination concerned with the vapor passage 22 with reference to the end remaining amount FF that is latest information that can be acquired by the internal combustion engine diagnostic unit 102 in relation to the remaining amount FV of liquid fuel and not with reference to the actual remaining amount FV of liquid fuel at the time when the second process is executed. However, when it is determined whether to perform the determination with reference to the end remaining amount FF, erroneous determination can be performed when fuel is added before the second process is executed after the ignition switch 501 turns off. In other words, even when the end remaining amount FF is smaller than the prescribed value FM, the remaining amount FV of liquid fuel can exceed the prescribed value FM at the time when the second process is executed as a result of addition of fuel. In this case, the situation in which the float valve is closing the opening of the vapor passage 22 is erroneously determined that a blockage is present in the vapor passage 22.

Therefore, when the start remaining amount FS is larger than or equal to the set value FW larger than the prescribed value FM, the internal combustion engine diagnostic unit 102 executes the invalidation process. In other words, in the case where the start remaining amount FS is larger than or equal to the set value FW, when the determination result of the second process indicates that a blockage is present in the vapor passage 22, there is a possibility that the float valve is closing the opening of the vapor passage 22 at the time when the second process is executed. Then, there is a possibility that the internal combustion engine diagnostic unit 102 determines the situation as that a blockage is present in the vapor passage 22. For this reason, when the start remaining amount FS is larger than or equal to the set value FW, the internal combustion engine diagnostic unit 102 invalidates the determination result that a blockage is present in the vapor passage 22. This prevents that the situation of whether there is a blockage of the vapor passage 22 is erroneously grasped.

(2) The determination result that no blockage is present in the vapor passage 22 is obtained only in a situation in which the float valve is not closing the opening of the vapor passage 22 and the fuel tank 31 is included in the pressure reducing object part. In other words, when the determination result of the second process indicates that no blockage is present in the vapor passage 22, it may be estimated that the float valve is not closing the opening of the vapor passage 22 at the time when the second process is executed. When the float valve is not closing the opening of the vapor passage 22 at the time when the second process is executed, the determination result of the second process does not need to be invalidated. Therefore, the internal combustion engine diagnostic unit 102 validates the determination result that no blockage is present in the vapor passage 22. With such a configuration, a situation that no blockage is present in the vapor passage 22 is reliably grasped.

(3) The volume of the pressure reducing object part varies depending on whether there is a blockage of the vapor passage 22. In other words, when a blockage is present in the vapor passage 22, the volume of the pressure reducing object part reduces by the amount of the fuel tank 31 as compared to when no blockage is present. Accordingly, when a blockage is present in the vapor passage 22, the amount of decrease in the pressure P in the pressure reducing object part at the time when the pressure is reduced by the pressure reducing pump 28 increases as compared to when no blockage is present. Therefore, it is possible to appropriately determine whether there is a blockage in the vapor passage 22 by checking a change in the pressure P in the pressure reducing object part.

(4) As described above, in the second process, a change in the pressure P in the pressure reducing object part is checked. Here, when a large amount of evaporated fuel is present in the pressure reducing object part as a result of the fact that the temperature of liquid fuel is high, the amount of change in the pressure P in the pressure reducing object part reduces. In this case, there is a possibility that an appropriate determination result is not able to be obtained through the second process. In terms of this point, in the present embodiment, the second process is executed after a lapse of the prescribed period H1 from when the ignition switch 501 turns off. In this case, it is possible to execute the second process in a situation in which generation of evaporated fuel settles down. Therefore, in relation to determination on whether there is a blockage of the vapor passage 22, it is possible to obtain an appropriate determination result without receiving the influence of evaporated fuel.

Modifications

The present embodiment may be modified as follows. The present embodiment and the following modifications may be implemented in combination with each other without any technical contradiction.

In the above-described embodiment, of the determination results of the second process, the invalidation process is executed only on the determination result that a blockage is present in the vapor passage 22, and the determination result is invalidated. Alternatively, the invalidation process may be executed on not only the determination result that a blockage is present in the vapor passage 22 but also the determination result that no blockage is present in the vapor passage 22, and the determination results may be invalidated. In other words, when the start remaining amount FS is larger than or equal to the set value FW, the determination result may be invalidated regardless of the details of the determination result. When such a configuration is adopted, the process details of the third process are simplified.

In the above-described embodiment, the invalidation process is executed when the start remaining amount FS is larger than or equal to the set value FW. Instead of this mode, when a value obtained by subtracting the end remaining amount FF from the start remaining amount FS is larger than or equal to a predetermined determination value, the invalidation process may be executed on the assumption that the start remaining amount FS is larger than or equal to the set value FW. In this case, the end remaining amount FF can be held and not cleared until the third process is executed. Then, the end remaining amount FF can be cleared after the end of the third process.

Here, when the difference between the start remaining amount FS and the end remaining amount FF is large, it may be estimated that liquid fuel is added to the fuel tank 31 while the ignition switch 501 is off. When liquid fuel is added to the fuel tank 31, liquid fuel is mostly added up to substantially a full level in most cases. In this case, the float valve closes the opening of the vapor passage 22. In consideration of such a background, as described above, it is effective that, when the difference between the start remaining amount FS and the end remaining amount FF is larger than or equal to the determination value, the invalidation process is executed on the assumption that the start remaining amount FS is larger than or equal to the set value FW. The above determination value may be determined by, for example, an experiment or the like as a value by which it may be assumed that a large amount of fuel is added.

Here, a detected value of the liquid level sensor 34 can have an error according to the individual difference of the liquid level sensor 34. For this reason, in determining whether to invalidate the determination result of the second process, when the magnitude of the detected value of the liquid level sensor 34 itself is referenced, the determination can be erroneously made due to an error according to the individual difference. In terms of this point, as described above, when the amount of change in the remaining amount FV of liquid fuel, such as a difference between the start remaining amount FS and the end remaining amount FF, is checked, a situation in which the determination result of the second process should be invalidated is grasped regardless of an error of a detected value according to the individual difference of the liquid level sensor 34.

A method of determining the set value FW is not limited to the example of the embodiment. The set value FW can be a value larger than or equal to the prescribed value FM. In other words, the set value FW may be set to the same value as the prescribed value FM. When the set value FW is a value larger than or equal to the prescribed value FM, it is possible to perform appropriate determination on whether to validate or invalidate the determination result.

A determining technique adopted in the second process is not limited to the example of the embodiment. In the second process, whether there is a blockage of the vapor passage 22 can be determined by reducing the pressure in the vapor passage 22 with the use of the pressure reducing mechanism.

Specifically, for example, the following method may be adopted as a determination method adopted in the second process. With this method, the pressure in the fuel tank 31 is used. Therefore, when the above method is used, a tank sensor that detects the pressure in the fuel tank 31 is provided in the fuel tank 31.

Here, it is assumed that the float valve is not closing the opening of the vapor passage 22. When no blockage is present in the vapor passage 22, the fuel tank 31 is included in the range of the pressure reducing object part. Therefore, when no blockage is present in the vapor passage 22, a manner in which the pressure P in the pressure reducing object part, detected by the pressure sensor 29, changes and a manner in which the pressure detected by a tank sensor changes are substantially the same when the pressure is reduced by the pressure reducing pump 28. In detail, the amount of decrease in the pressure P in the pressure reducing object part, detected by the pressure sensor 29, is substantially the same as the amount of decrease in pressure detected by the tank sensor. On the other hand, when a blockage is present in the vapor passage 22, the fuel tank 31 is not included in the range of the pressure reducing object part. Therefore, when a blockage is present in the vapor passage 22, the pressure P in the pressure reducing object part, detected by the pressure sensor 29, decreases when the pressure is reduced by the pressure reducing pump 28; however, the pressure detected by the tank sensor substantially remains unchanged. Therefore, it is also possible to determine whether there is a blockage of the vapor passage 22 by using a difference in a manner in which the pressure is changed as described above between the detected value of the pressure sensor 29 and the detected value of the tank sensor.

In the above-described embodiment, as an action at the time when the determination result is validated or invalidated, the flag is set or the alarm lamp 503 is turned on. However, a manner of an action at the time when the determination result is validated or invalidated is not limited to the example of the above embodiment. As long as the determination result that a blockage is present in the vapor passage 22 is invalidated when the start remaining amount FS is larger than or equal to the set value FW, any manner of an action is possible.

A manner of setting the flags in the above embodiment is just one example, and a manner of setting the flags is not limited thereto. In executing the blockage diagnosis process, the flags do not need to be set. As long as it is possible to appropriately execute the first acquisition process, the determination process, the second acquisition process, and the invalidation process, the flags do not necessarily need to be used.

In the above-described embodiment, when it is confirmed that a blockage is present in the vapor passage 22, the blockage diagnosis process is stopped until the reset switch is operated thereafter. However, when it is confirmed that a blockage is present in the vapor passage 22, the blockage diagnosis process may be repeated regardless of whether the reset switch is operated. When the blockage diagnosis process is repeated in this way, after it is confirmed that a blockage is present in the vapor passage 22, it can be determined that no blockage is present in the vapor passage 22 when the blockage diagnosis process is executed again. When information is recorded each time it is confirmed that the a blockage is present in the vapor passage 22, even when the determination result changes with time as described above, it is possible to grasp an abnormality in the vapor passage 22 by, for example, reading the information at a dealer.

The reset switch is not indispensable. For example, as in the case of the above modification, when the blockage diagnosis process is repeated, no reset switch is needed. After the ignition switch 501 turns off, the second process may be executed before the prescribed period H1 elapses. Even in a situation in which the temperature of liquid fuel is considerably high and a considerably large amount of evaporated fuel is present in the pressure reducing object part, the pressure P in the pressure reducing object part can change according to a reduction in pressure. By capturing a change in the pressure P, it is possible to determine whether there is a blockage of the vapor passage 22.

The timing to clear the end remaining amount FF is not limited to the example of the above embodiment. Furthermore, the end remaining amount FF may be continued to be held without being cleared. Then, when the end remaining amount FF is acquired next time, the end remaining amount FF may be updated. The end remaining amount FF just needs to be held when the process using the end remaining amount FF is executed. This also applies to the start remaining amount FS.

The configuration of the additional mechanism 30 is not limited to the example of the above embodiment. The additional mechanism 30 just needs to include the fuel tank 31, the canister 25, the vapor passage 22, the float valve, the remaining amount sensor, and the pressure reducing mechanism.

Of the two float valves, that is, the cut-off valve 36 and the roll over valve 37, for example, the roll over valve 37 may be omitted. In this case, of the first passage 22A and the second passage 22B in the vapor passage 22, the second passage 22B that the roll over valve 37 opens and closes can be omitted.

The configuration of the atmosphere passage 24 is not limited to the example of the embodiment. For example, a bypass passage that bypasses the pressure sensor 29 and the pressure reducing pump 28 may be connected to the atmosphere passage 24. An electromagnetic valve that opens and closes such a bypass passage may be provided. The configuration that reduces the pressure in the pressure reducing object part may include such a structure around the atmosphere passage 24. In other words, the pressure reducing mechanism is not limited to the example of the embodiment and may be configured to be able to reduce the pressure in the pressure reducing object part.

The vehicle 500 may be configured as a hybrid electric vehicle. In other words, the vehicle 500 may include a motor generator in addition to the internal combustion engine 10 as the driving source of the vehicle 500. When the vehicle 500 is a hybrid electric vehicle, the ignition switch 501 can be referred to as start switch.

The diagnostic device may be made up of not the controller 100 of the vehicle 500. The diagnostic device may be made up of, for example, a server outside the vehicle 500. In this case, the server and the vehicle 500 are configured so as to communicate with each other. The server is configured to be able to acquire information on the vehicle 500, and the server is configured to be able to drive the pressure reducing mechanism. With such a configuration, the server is able to execute the series of processes of the blockage diagnosis process. In this case, when a blockage is present in the vapor passage 22, the server is able to grasp the information. When information on the vehicle 500 is intended to be managed by the server, such a mode is effective.

What is claimed is:

1. A diagnostic system for an evaporated fuel treatment system, the diagnostic system comprising:
    a fuel tank configured to store liquid fuel;
    a canister configured to adsorb evaporated fuel generated in the fuel tank to collect the evaporated fuel;
    a vapor passage connecting the fuel tank with the canister;
    a float valve disposed in the fuel tank and configured to move up and down in accordance with a change in level of liquid fuel to close and open an opening of the vapor passage adjacent to the fuel tank;
    a remaining amount sensor disposed in the fuel tank and configured to detect a remaining amount of liquid fuel;
    a pressure reducing mechanism configured to reduce a pressure in the vapor passage; and
    a diagnostic device configured to determine whether there is a blockage of the vapor passage, wherein:
    the diagnostic device is configured to execute
        a first acquisition process of acquiring a remaining amount of liquid fuel in the fuel tank when an ignition switch of a vehicle on which the fuel tank is mounted turns off, as an end remaining amount,
        a determination process of, after the first acquisition process, determining whether there is a blockage of the vapor passage by reducing a pressure in the vapor passage with the use of the pressure reducing mechanism when the end remaining amount is smaller than a predetermined prescribed value while the ignition switch of the vehicle is off,
        a second acquisition process of, after the determination process, acquiring a remaining amount of liquid fuel in the fuel tank when the ignition switch of the vehicle turns on, as a start remaining amount, and
        an invalidation process of invalidating a determination result that a blockage is present in the vapor passage in the determination process when the start remaining amount is larger than or equal to a predetermined set value.

2. The diagnostic system according to claim 1, wherein the diagnostic device is configured to, when the diagnostic device determines in the determination process that no blockage is present in the vapor passage, not execute the invalidation process and validate a determination result that no blockage is present in the vapor passage.

3. The diagnostic system according to claim 1, wherein the diagnostic device is configured to, in the invalidation process, when a value obtained by subtracting the end remaining amount from the start remaining amount is larger than or equal to a predetermined determination value, assume that the start remaining amount is larger than or equal to the set value and invalidate a determination result that a blockage is present in the vapor passage.

4. The diagnostic system according to claim 1, wherein the diagnostic device is configured to, in the determination process, determine whether there is a blockage of the vapor passage based on an amount of change per unit time in pressure in the vapor passage when the pressure reducing mechanism has reduced a pressure in the vapor passage.

5. The diagnostic system according to claim 1, wherein the diagnostic device is configured to execute the determination process after a lapse of a predetermined prescribed period from when the ignition switch of the vehicle turns off.

* * * * *